(12) United States Patent
Suzuki et al.

(10) Patent No.: US 9,872,353 B2
(45) Date of Patent: Jan. 16, 2018

(54) LED LIGHTING DEVICE AND LED ILLUMINATING DEVICE

(71) Applicant: Renesas Electronics Corporation, Tokyo (JP)

(72) Inventors: Motoaki Suzuki, Tokyo (JP); Mamoru Kitamura, Tokyo (JP); Keisuke Fukuda, Tokyo (JP)

(73) Assignee: Renesas Electronics Corporation, Koutou-ku, Tokyo (JP)

( * ) Notice: Subject to any disclaimer, the term of this patent is extended or adjusted under 35 U.S.C. 154(b) by 0 days.

(21) Appl. No.: 15/047,796

(22) Filed: Feb. 19, 2016

(65) Prior Publication Data

US 2016/0295657 A1     Oct. 6, 2016

(30) Foreign Application Priority Data

Mar. 31, 2015  (JP) ................................. 2015-071172

(51) Int. Cl.
*H05B 33/08*  (2006.01)
(52) U.S. Cl.
CPC ..... *H05B 33/0851* (2013.01); *H05B 33/0815* (2013.01); *Y02B 20/347* (2013.01)
(58) Field of Classification Search
CPC ............ H05B 33/0851; H05B 33/0818; H05B 33/0839; H05B 33/0845; H05B 33/0848; H05B 33/0866; H05B 33/0875; H05B 33/0884; H05B 37/02; H05B 33/0833

USPC ... 315/291, 300, 302, 247, 200 R, 227, 297, 315/307–308

See application file for complete search history.

(56) References Cited

U.S. PATENT DOCUMENTS

| | | | |
|---|---|---|---|
| 2010/0259956 A1* | 10/2010 | Sadwick | H05B 33/0815 363/50 |
| 2013/0154487 A1* | 6/2013 | Kuang | H05B 33/0815 315/171 |
| 2016/0029455 A1* | 1/2016 | Aydin | H05B 33/0827 315/193 |

FOREIGN PATENT DOCUMENTS

JP     2013-30373 A     2/2013

* cited by examiner

*Primary Examiner* — Jimmy Vu
*Assistant Examiner* — Henry Luong
(74) *Attorney, Agent, or Firm* — Sughrue Mion, PLLC

(57) ABSTRACT

An LED lighting device 2 according to this embodiment includes a lighting circuit that supplies a current to an LED, and a dimmer 7 that generates a PWM signal for controlling the supply of the current to the LED from the lighting circuit, in which the dimmer 7 feedback-controls the PWM signal that controls the supply of the current to the LED by comparing the output current to be output to the LED with a target current and feedforward-controls the PWM signal according to a fluctuation of an input voltage from a commercial power supply 1.

8 Claims, 10 Drawing Sheets

LED LIGHTING DEVICE AND LED ILLUMINATING DEVICE

CROSS-REFERENCE TO RELATED APPLICATIONS

This application is based upon and claims the benefit of priority from Japanese patent application No. 2015-071172, filed on Mar. 31, 2015, the disclosure of which is incorporated herein in its entirety by reference.

BACKGROUND

The present invention relates to an LED lighting device and an LED illuminating device, and relates to, for example, an LED lighting device and an LED illuminating device in which a flicker of an LED does not occur even when an input voltage fluctuates.

An LED lighting device that converts an AC voltage of a commercial power supply into a DC voltage and supplies a predetermined current to an LED to perform dimming is known (e.g., Japanese Unexamined Patent Application Publication No. 2013-30373). A DC lighting device disclosed in Japanese Unexamined Patent Application Publication No. 2013-30373 performs dimming control in proportion to a waveform of an input voltage by controlling a phase of the commercial power supply.

In this DC lighting device, in order to reduce a flicker of an LED due to a fluctuation of the input voltage, a voltage fluctuation absorbing circuit of the commercial power supply is provided. The voltage fluctuation absorbing circuit absorbs a ripple based on a low frequency voltage and a low frequency current that cannot be smoothed by an output smoothing circuit.

SUMMARY

In Japanese Unexamined Patent Application Publication No. 2013-30373, a transistor is added to the subsequent stage of the output smoothing circuit as the voltage fluctuation absorbing circuit and a collector current of the transistor is controlled to be constant to prevent a fluctuation of an output current to the LED. As stated above, in Japanese Unexamined Patent Application Publication No. 2013-30373, it is required to add the circuit to prevent the flicker, which increases the size of the circuit.

The other problems of the related art and the novel characteristics of the present invention will be made apparent from the descriptions of the specification and the accompanying drawings.

According to one embodiment, a control signal that controls a supply of a current to an LED is feedback-controlled by comparing an output current to be output to an LED with a target current and is feedforward-controlled according to a fluctuation of a commercial power supply.

According to the embodiment, it is possible to prevent the fluctuation of the output current to the LED due to the fluctuation of the input voltage without adding the circuit for preventing the flicker.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

For the clarification of the description, the following description and the drawings may be omitted or simplified as appropriate. The specific values and the like described in this embodiment are merely examples to facilitate the understanding of the present invention and the present invention is not limited to them unless otherwise stated. Throughout the drawings, the same components are denoted by the same reference symbols and overlapping descriptions will be omitted as appropriate.

This embodiment relates to an LED illuminating device that includes an LED lighting device that converts an AC voltage from a commercial power supply into a DC voltage and supplies the DC voltage to an LED to light up the LED. The LED lighting device according to this embodiment feedback-controls a control signal that controls a supply of power to the LED by comparing an output current to be output to the LED with a target current to perform a dimmer control. Further, the control signal is feedforward-controlled according to a fluctuation of an input voltage and suppresses a flicker of the LED even when the input voltage fluctuates.

Hereinafter, with reference to the drawings, this embodiment will be described.

<First Embodiment>

Figure 1:
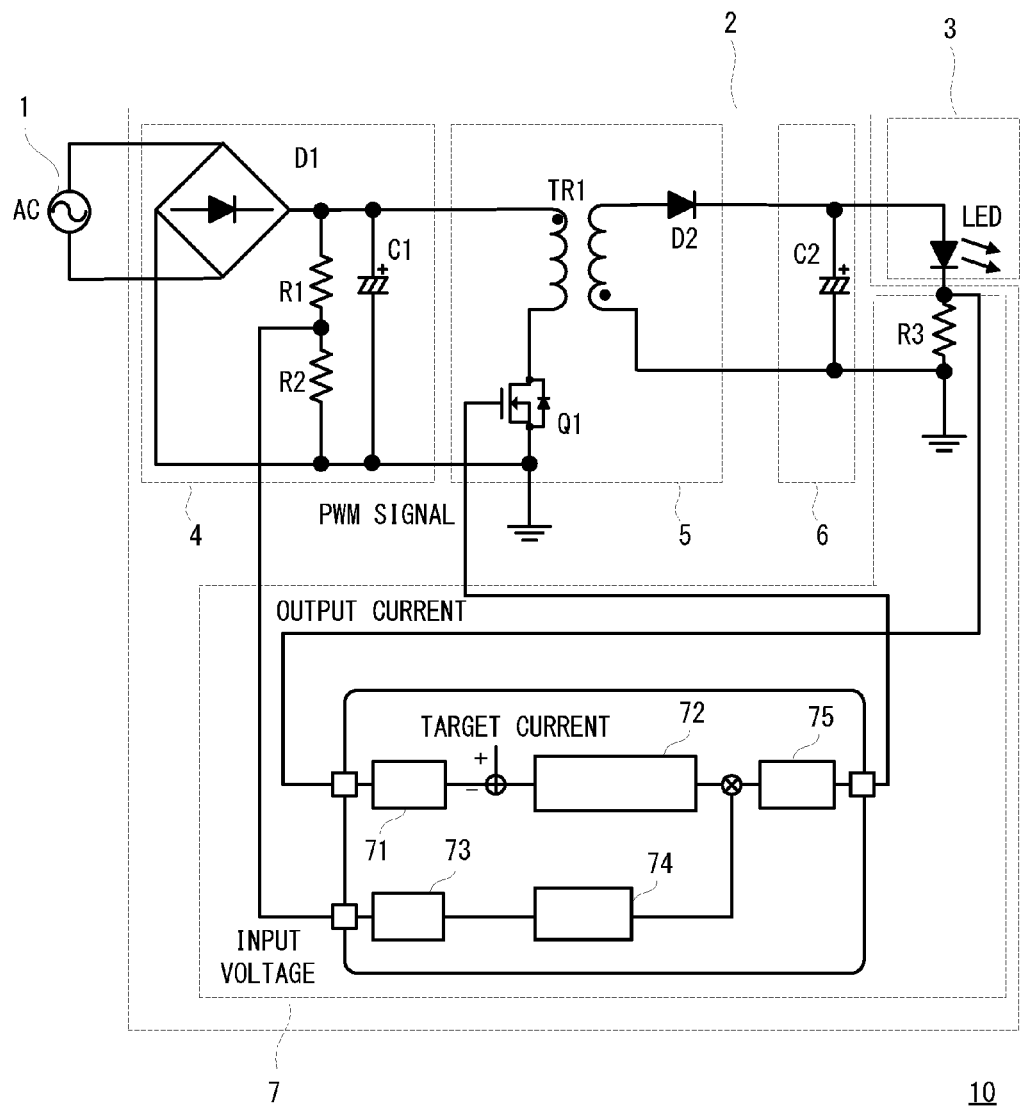
FIG. 1 is a diagram showing a configuration of an LED illuminating device according to a first embodiment.

With reference to FIG. 1, an LED illuminating device according to a first embodiment will be described. FIG. 1 is a diagram showing a configuration of an LED illuminating device 10 according to the first embodiment. As shown in FIG. 1, the LED illuminating device 10 includes a commercial power supply 1, an LED lighting device 2, and an LED module 3.

(Lighting Device 2)

The LED lighting device 2 converts an alternating current from the commercial power supply 1 into a direct current and outputs the direct current to the LED module 3. The commercial power supply 1 is connected to the input side of the LED lighting device 2. Further, the LED module 3 is connected to the output side of the LED lighting device 2.

The LED lighting device 2 includes an input smoothing circuit 4, an inverter circuit 5, an output smoothing circuit 6, and a dimmer 7. The input smoothing circuit 4, the inverter circuit 5, and the output smoothing circuit 6 are lighting circuits that supply current to the LED. Further, the dimmer 7 is a controller that generates a control signal for controlling a current supply from the lighting circuit to the LED.

(Input Smoothing Circuit 4)

The input smoothing circuit 4 includes a rectifier circuit D1, resistors R1 and R2, and a capacitor C1. The rectifier circuit D1 is a diode bridge formed of four diodes. The commercial power supply 1 is connected to the AC input end of the rectifier circuit D1. The rectifier circuit D1 converts an AC voltage from the commercial power supply 1 into a pulsating DC voltage. The rectifier circuit Dl full-wave rectifies the AC voltage having a sinusoidal wave shape supplied from the commercial power supply 1.

The resistors R1 and R2 and the capacitor C1 are connected in parallel to the DC output end of the rectifier circuit D1. The capacitor C1 smooths the DC voltage rectified in the rectifier circuit D1. In order to measure the DC voltage, which is the input voltage, the input smoothing circuit 4 is connected to the dimmer 7 via the resistors R1 and R2.

(Inverter Circuit 5)

The inverter circuit 5 converts the DC voltage from the input smoothing circuit 4 into a predetermined DC voltage. The inverter circuit 5 includes a flyback transformer TR1, a switching element Q1, and a rectifier circuit D2. The positive electrode of the capacitor C1 is connected to one end of a primary winding of the flyback transformer TR1.

The other end of the primary winding of the flyback transformer TR1 is connected to the drain electrode of the switching element Q1 formed of a MOSFET. The source electrode of the switching element Q1 is connected to the ground and is connected to the negative electrode of the capacitor C1. The pulsating DC voltage from the input smoothing circuit 4 is applied to the primary side of the flyback transformer TR1 of the inverter circuit 5.

By chopping the DC voltage from the input smoothing circuit 4 by the switching element Q1, a predetermined DC voltage is transmitted to a secondary side of the flyback transformer TR1. The gate electrode of the switching element Q1 is supplied with a PWM signal from the dimmer 7. The PWM signal is a control signal that controls ON and OFF of the switching element Q1 and controls the supply of the current to the LED. For example, when the PWM signal is at the high level, the switching element Q1 is turned on and when the PWM signal is at the low level, the switching element Q1 is turned off.

Figure 2:
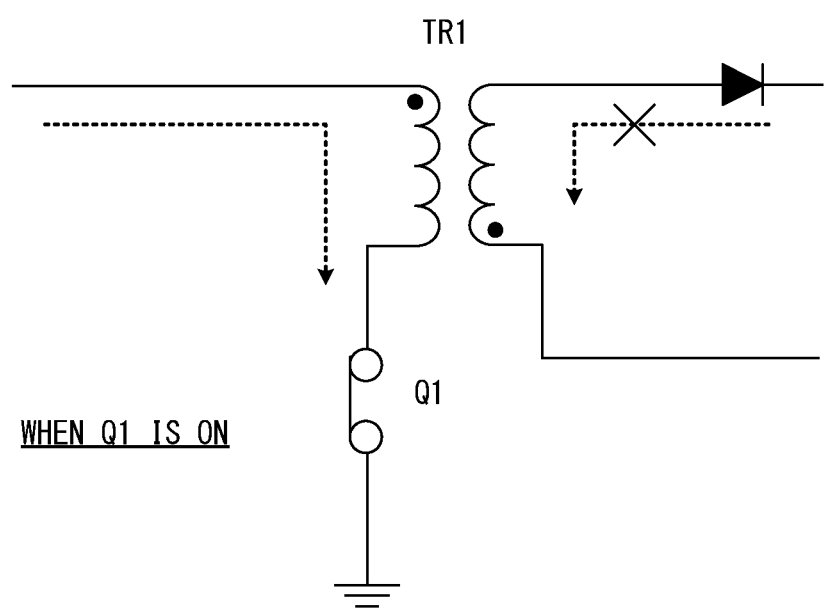
FIG. 2 is a diagram for describing an operation of an LED lighting device according to the first embodiment.
Figure 3:
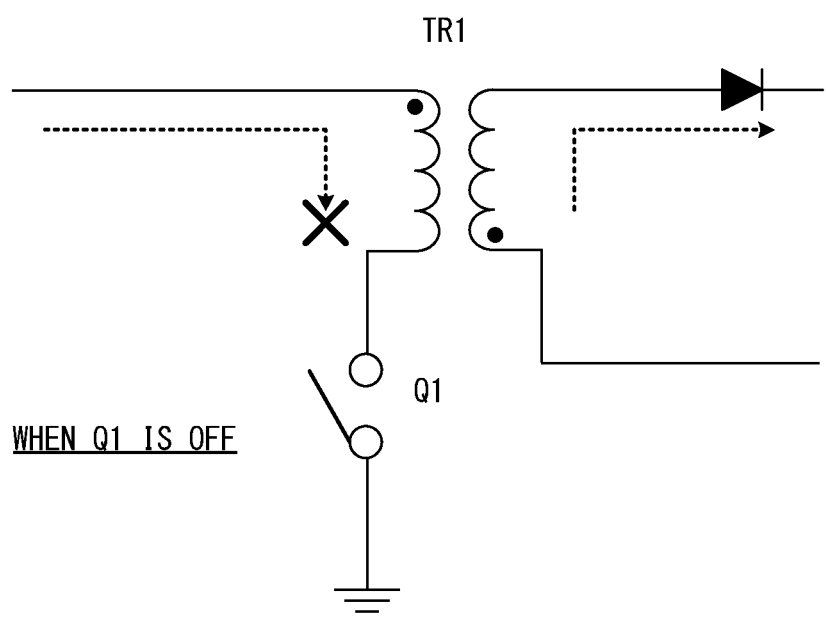
FIG. 3 is a diagram for describing an operation of the LED lighting device according to the first embodiment.

Now, with reference to FIGS. 2 and 3, an operation of the flyback transformer TR1 will be described. FIGS. 2 and 3 are diagrams for describing the operation of the flyback transformer TR1 of the LED lighting device according to the first embodiment. As shown in FIG. 2, when the switching element Q1 is turned on, current flows through the primary winding of the flyback transformer TR1. Due to a magnetic field occurring due to the flow of the current, a core is magnetized and energy is accumulated.

As shown in FIG. 3, when the switching element Q1 is turned off, the energy accumulated in the core is released and current flows through a secondary winding. The current from the secondary winding is supplied to the LED through the rectifier circuit D2. In this way, the value of the output current is determined by turning on or off the switching element Q1 by the dimmer 7. One end of the secondary winding of the flyback transformer TR1 is connected to the anode of the rectifier circuit D2. The rectifier circuit D2 rectifies the current from the secondary winding of the flyback transformer TR1.

(Output Smoothing Circuit 6)

The output smoothing circuit 6 includes a capacitor C2. The output smoothing circuit 6 smooths the current transmitted from the flyback transformer TR1 to obtain a desired DC voltage. The cathode of the rectifier circuit D2 is connected to the positive electrode of the capacitor C2.

The negative electrode of the capacitor C2 is connected to the other end of the secondary winding of the flyback transformer TR1 and is connected to the ground. The voltage between both electrodes of the capacitor C2 is output to the LED module 3. Since a predetermined DC voltage is applied to the LED, a constant current flows through the LED and a constant optical output is obtained. Further, in order to measure the output current in the cathode of the LED, a resistor R3 of the dimmer 7 is connected in series to the LED.

(Dimmer 7)

The dimmer 7 is a controller that controls the switching element Q1 to perform dimming of the LED module 3. The dimmer 7 compares the output current to be output to the LED with the target current indicating the dimming level, feedback-controls the control signal, and generates a corrected control signal so that the LED reaches a predetermined dimming level. Further, the dimmer 7 detects the fluctuation of the input voltage from the commercial power supply 1 connected to the lighting circuit and feedforward-controls the corrected control signal according to the fluctuation of the input voltage.

The dimmer 7 is a microcomputer (Micro Control Unit) that includes an analog/digital converter (hereinafter it will be referred to as an ADC) 71, a feedback control circuit 72, an ADC 73, an input fluctuation detection circuit 74, and a PWM signal generation circuit 75. The ADC 71 converts an output current from the LED into digital data. The feedback control circuit 72 compares the output current indicated by the digital value converted in the ADC 71 with the target current to generate the corrected control signal that controls the switching element Q1 so that the DC voltage supplied to the LED from the LED lighting device 2 approaches a desired value.

The ADC 73 converts the input voltage to the LED lighting device 2 into digital data. The input fluctuation detection circuit 74 detects the fluctuation of the input voltage indicated by the digital value converted in the ADC 73 and feedforward-controls the corrected control signal output from the ADC 73 according to the rate of fluctuation of the input voltage.

The PWM signal generation circuit 75 generates the PWM signal from the control signal that has been feedforward-controlled. This PWM signal is output to the switching element Q1. The switching element Q1 is turned on or off corresponding to a pulse period and a duty ratio of the PWM signal.

Figure 4:
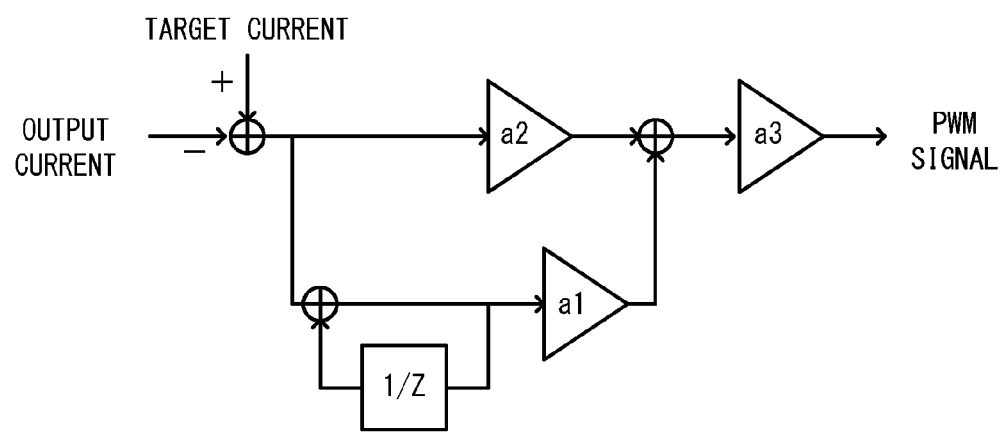
FIG. 4 is a diagram for describing an operation of the LED lighting device when an input voltage fluctuates according to the first embodiment.
Figure 5:
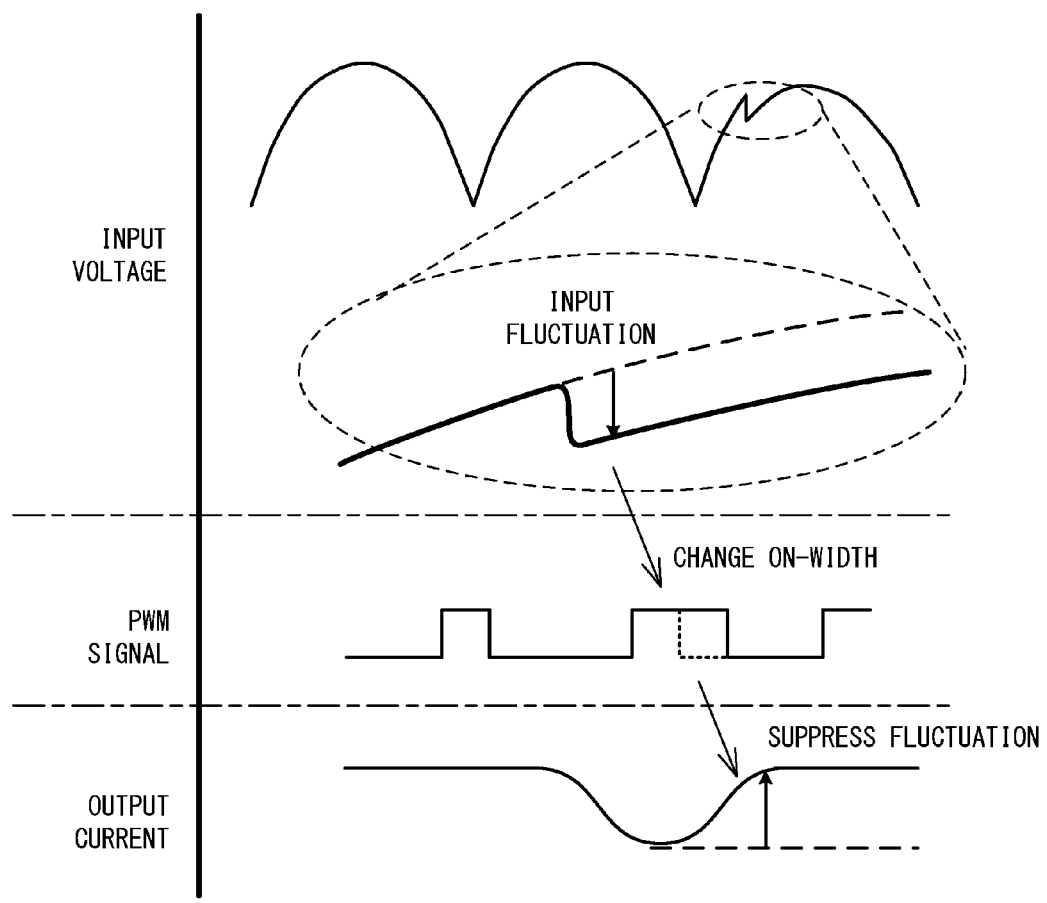
FIG. 5 is a diagram showing waveforms of an input voltage, a PMW signal, and an output current of the LED lighting device according to the first embodiment.

Now, with reference to FIGS. 4 and 5, a method of controlling the LED lighting device 2 when the input voltage fluctuates will be described. FIG. 4 is a diagram for describing an operation when the input voltage of the dimmer 7 provided in the LED lighting device 2 is fluctuated. FIG. 5 is a diagram showing waveforms of the input voltage, the PMW signal, and the output current of the LED lighting device.

An example in which the feedback control is performed by a PI (Proportional-Integral) control is described here. The feedback control circuit 72 generates the corrected control signal that is proportional to the magnitude of the deviation between the current output current and the target current and is proportional to the magnitude of the integrated value (accumulated value) of the deviation in the past. Specifically, the feedback control circuit 72 adds a proportional term obtained by multiplying the deviation between the output current and the target current by a P gain (proportionality coefficient) to an integral term obtained by adding a value obtained by multiplying this deviation by an I gain (integral coefficient) to the last value to generate the corrected control signal. That is, the feedback control circuit 72 generates the PWM signal based on the deviation between the target current and the output current and the integral control element of this deviation.

FIG. 4 is a block diagram of the feedback control and shows a delay element that is delayed by one cycle as 1/Z. The symbol a1 denotes the integral coefficient (I gain) and a2 denotes the proportionality coefficient (P gain) . The symbol a3 is a coefficient that is updated when there is a fluctuation of the input voltage.

The dimmer 7 performs feedback control to eliminate the deviation between the output current measured in the resistor R3 and the target current. Further, the dimmer 7 compares the input voltage measured by the resistor R1 with a value half a cycle before a sinusoidal wave obtained by full-wave rectification to perform feedforward control. In the feedforward control, the inverse number of the rate of fluctuation of the input voltage is multiplied by an ON width of the PWM signal indicated by the corrected control signal output from the feedback control circuit 72.

When the input voltage increases, the ON width decreases and when the input voltage decreases, the ON width increases. In this way, the ON width of the PWM signal is changed to cancel the fluctuation of the input voltage. As shown in FIG. 5, when the input voltage decreases, the ON width of the PWM signal increases and the fluctuation of the output current is suppressed.

When the input voltage increases by 0.8 times, for example, a3', which denotes a value obtained by multiplying a3 by 1.25 (=10/8), is a new coefficient. When the input voltage is then doubled, a3", which denotes a value obtained by multiplying a3' by 0.5 (1/2), is a new coefficient. The ON width of the PWM signal is thus controlled, whereby it is possible to suppress the change of the output current due to the input fluctuation.

Figure 9:
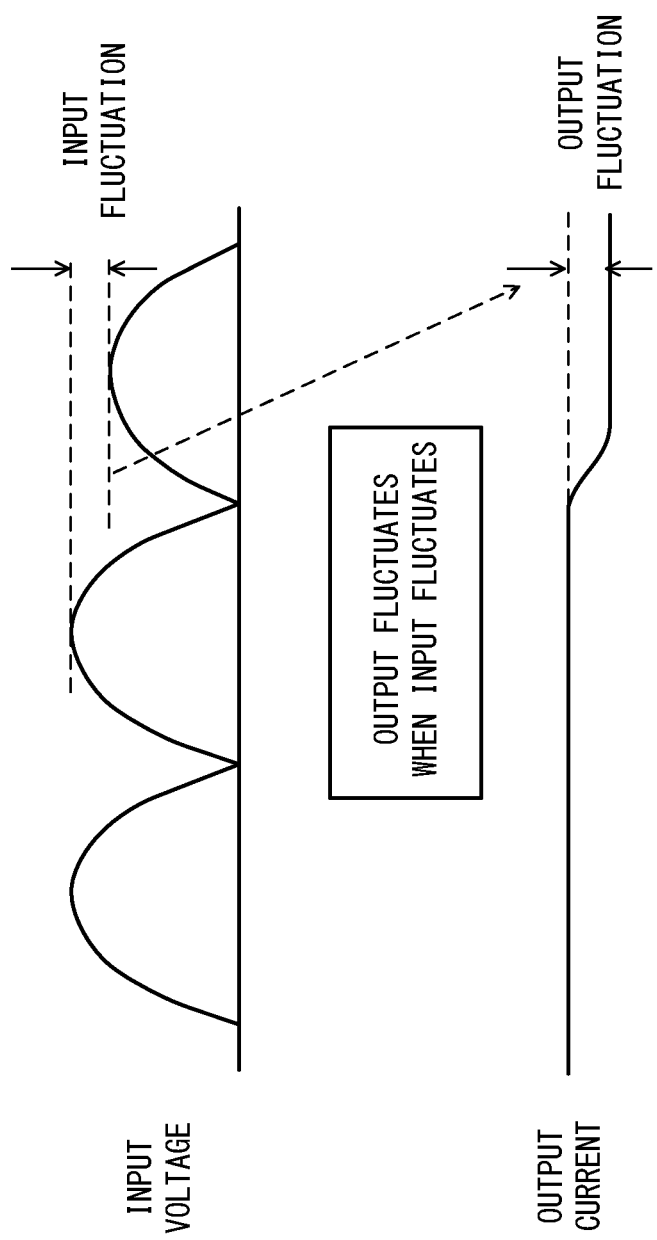
FIG. 9 is a diagram showing a waveform of an output current when an input voltage fluctuates when there is no flicker preventing circuit.

Now, with reference to FIG. 9, a waveform of the output current when the input voltage fluctuates when there is no flicker preventing circuit will be described. In the LED illuminating device that uses the commercial power supply, as shown in FIG. 9, there is a problem that the output current decreases and a flicker occurs in the LED due to a temporary drop of the voltage of the commercial power supply when another household electrical appliance such as, for example, a dryer is used.

Figure 10:
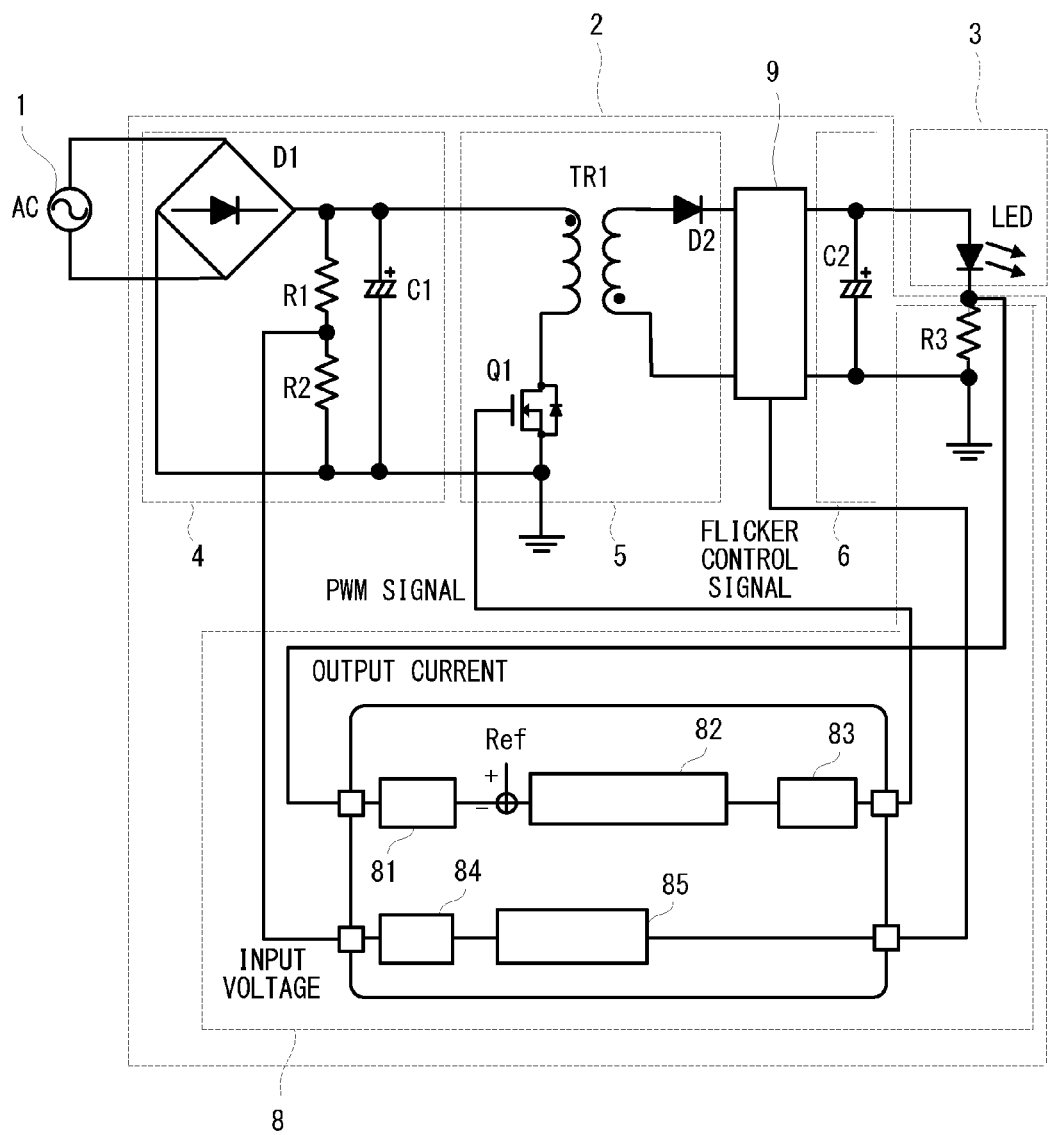
FIG. 10 is a diagram showing a configuration of an LED illuminating device according to a comparative example.

In order to solve the above problem, the present inventors invented a comparative example in which a flicker preventing circuit 9 is provided between an inverter circuit 5 and an output smoothing circuit 6, as shown in FIG. 10. In the comparative example shown in FIG. 10, a dimmer 8 includes an ADC 81, a feedback control circuit 82, a PWM control circuit 83, an ADC 84, and an input fluctuation detection circuit 85.

In this comparative example, the dimmer 8 does not consider the fluctuation of the input voltage and observes only the output current and feedback-controls the PWM signal. In order to suppress a flicker, the dimmer 8 monitors the input voltage and generates a flicker control signal to control the flicker preventing circuit 9 according to the fluctuation of the input voltage. When the fluctuation of the input voltage is observed, the load of the flicker preventing circuit 9 is changed and the output current is corrected.

In the comparative example shown in FIG. 10, however, it is required to add the flicker preventing circuit 9, which increases the size of the circuit. Further, as the flicker preventing circuit 9 consumes power, it is still required to reduce power consumption.

Meanwhile, in this embodiment, it is possible to control the ON width of the PWM signal in such a way that the output current does not change due to the fluctuation of the input voltage without additionally providing the flicker preventing circuit. It is therefore possible to suppress the increase in the size of the circuit. Further, since there is no flicker preventing circuit, power consumption can be reduced.

Second Embodiment

Figure 6:
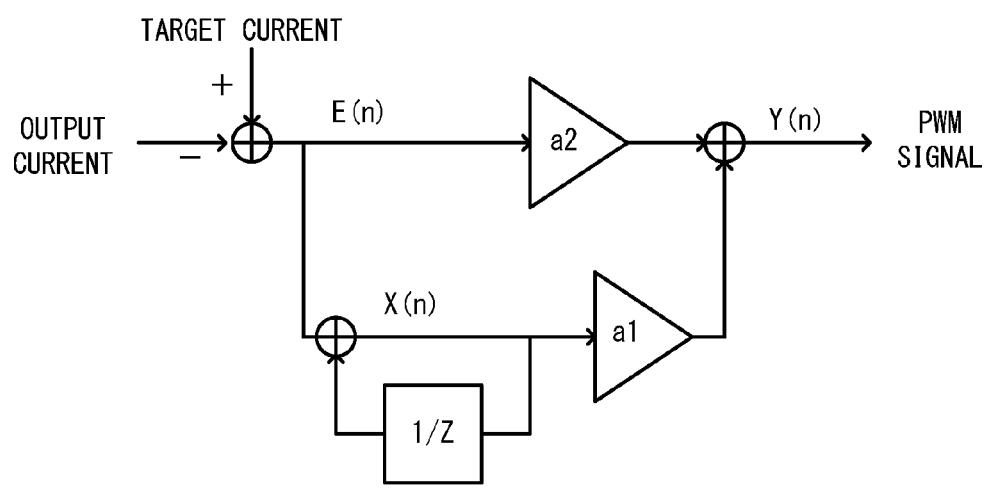
FIG. 6 is a diagram for describing an operation of an LED lighting device when an input voltage fluctuates according to a second embodiment.

With reference to FIG. 6, an operation of an LED lighting device when an input fluctuation occurs according to a second embodiment will be described. FIG. 6 is a diagram for describing an operation of the dimmer 7 provided in the LED lighting device 2 when the input voltage is fluctuated. In the control method when the input voltage fluctuates according to the first embodiment, the DC gain (coefficient a3) of the feedback control is changed and the characteristics of the feedback control are changed every time the fluctuation of the input voltage occurs. Further, the feedback control circuit 72 performs digital control and the resolution is also changed according to the change of the duty ratio of the PWM signal. In the control method according to the second embodiment, these points are improved.

In the example shown in FIG. 6 as well, the feedback control is performed by the PI control. FIG. 6 is a block diagram of the feedback control and indicates the delay element that is delayed by one cycle as 1/Z. The symbol a1 denotes an integral coefficient (I gain) and a2 denotes a proportionality coefficient (P gain). The symbol E(n) denotes a deviation between the output current and the target current (target current-output current). Further, the symbol X(n) denotes an integrated value and the symbol Y(n) denotes a PWM signal that is output.

The integrated value X(n) is obtained by adding the current deviation E(n) to the previously-obtained integrated value (accumulated value) X(n−1) and is expressed by the following Expression (1).

$$X(n)=X(n-1)+E(n) \qquad (1)$$

Further, the PWM signal Y(n) is expressed by the following Expression (2).

$$Y(n)=a1 \cdot X(n)+a2 \cdot E(n) \qquad (2)$$

In the second embodiment, the corrected control signal is multiplied by the inverse number of the rate of fluctuation of the input voltage and the integrated value X(n) is multiplied by the inverse number of the rate of fluctuation of the input voltage only when the fluctuation of the input voltage occurs. That is, the PWM signal is changed according to the rate of fluctuation of the input voltage and at the same time the integrated value X(n) is changed at the same rate. The PWM signal Y(n)' and the integrated value X(n)' changed when the input fluctuation occurs are expressed by the following Expressions (3) and (4).

$$Y(n)'=Y(n)(1/Z) \qquad (3)$$

$$X(n)'=X(n)(1/Z) \qquad (4)$$

That is, the input fluctuation detection circuit 74 multiplies the corrected control signal generated by the feedback control circuit 72 by the inverse number of the rate of fluctuation of the input voltage to change the ON width of the PWM signal and multiplies the integral control element by the inverse number of the rate of fluctuation of the input voltage to update the integral control element. According to this control method, the coefficient a3, which is updated when the fluctuation of the input voltage occurs, is unnecessary. It is therefore possible to suppress the decrease of the resolution of the digital control without changing the characteristics of the feedback control.

Figure 7:
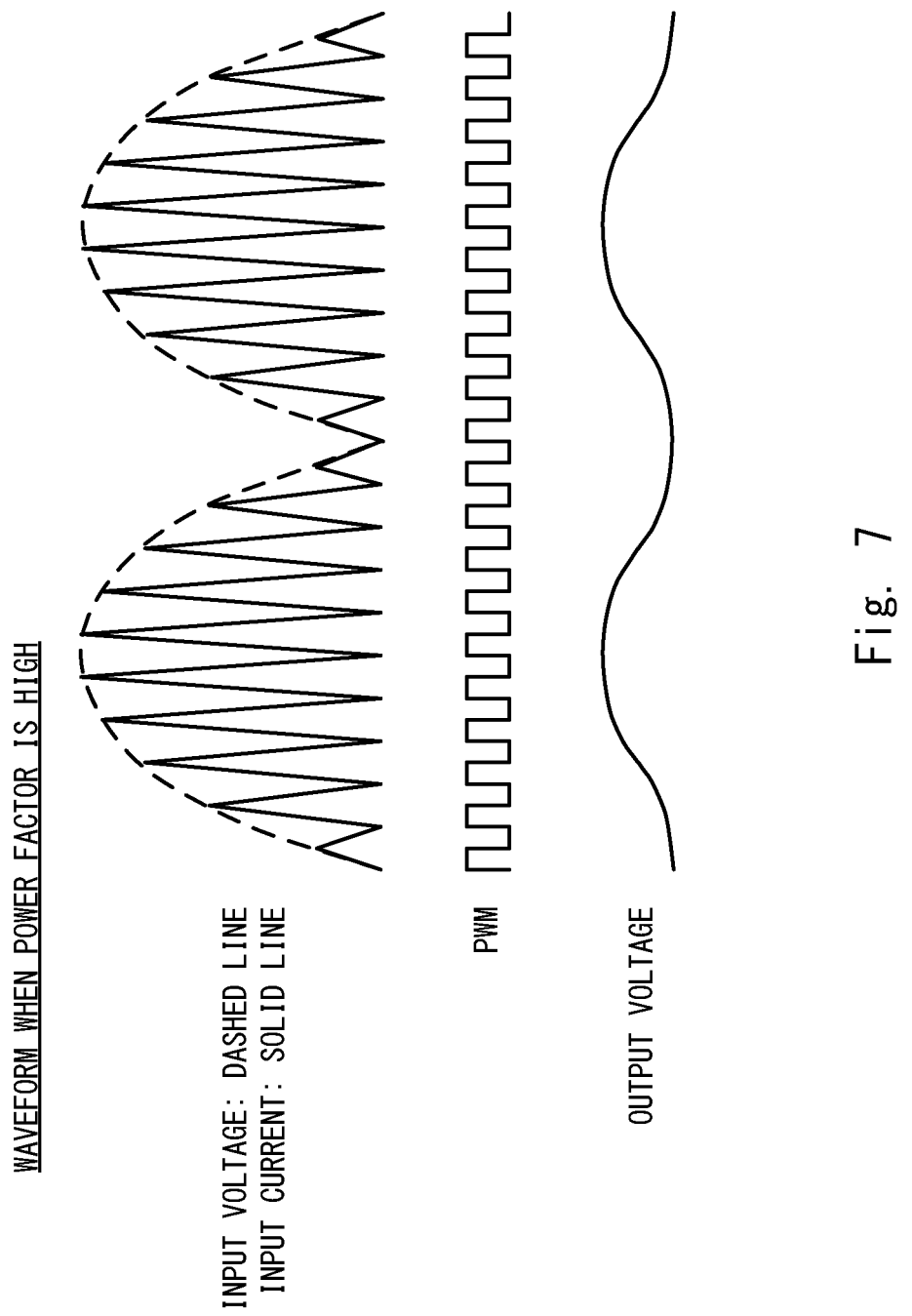
FIG. 7 is a diagram for describing an effect when a responsiveness of feedback control is improved in the LED lighting device having a PFC function.
Figure 8:
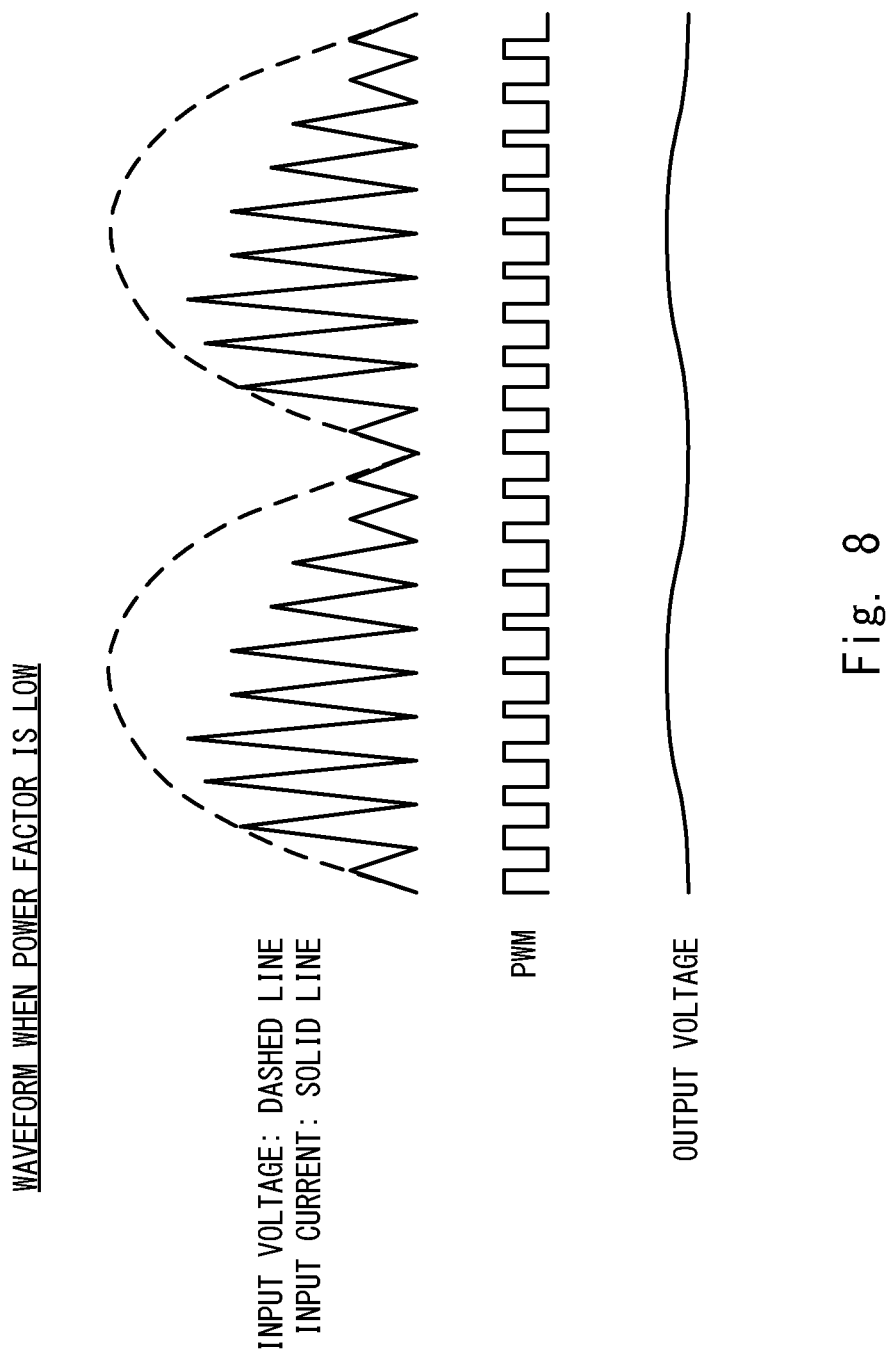
FIG. 8 is a diagram for describing an effect when the responsiveness of feedback control is improved in the LED lighting device having the PFC function.

Referring next to FIGS. 7 and 8, a case in which the LED lighting device 2 has a power factor correction (PFC) function will be described. FIGS. 7 and 8 are diagrams for describing effects when the responsiveness of the feedback control is improved in the LED lighting device having the PFC function. FIG. 7 shows waveforms in which the power factor is high and FIG. 8 shows waveforms in which the power factor is low. In FIGS. 7 and 8, the input voltage is shown by the dashed line and the input current is shown by the solid line.

The LED lighting device 2 having the PFC function suppresses degradation of the power factor and occurrence of harmonics due to a deviation of the input current with respect to the input voltage. For example, as a circuit that has the PFC function, an AC line filter circuit may be provided between the commercial power supply 1 and the rectifier circuit D1 and a DC/DC converter that converts a DC voltage to be output to the inverter circuit 5 into a desired DC voltage may be provided.

In the inverter circuit 5 that has the PFC function, various voltages and currents are periodically sampled and the input current is output according to the sinusoidal wave of the input voltage. When the power factor is high as shown in FIG. 7, the phase of the input voltage becomes equal to the phase of the input current. As stated above, when the LED lighting device 2 has the PFC function, it is difficult to improve the response characteristics of the feedback control. Therefore, as shown in FIG. 7, when the input voltage fluctuates, the output voltage from the LED lighting device 2 fluctuates.

In this embodiment, the feedforward control is performed and the ON width of the PWM signal is changed to improve the responsiveness only when the input voltage fluctuates. As stated above, when the responsiveness of the feedback control is improved, as shown in FIG. 8, the waveform of the sinusoidal wave of the input voltage does not conform to the waveform of the input current and the power factor is degraded. However, it is possible to change the ON width of the PWM signal to cancel the fluctuation of the input voltage by the feedforward control. It is therefore possible to suppress the fluctuation of the output voltage and to efficiently prevent the flicker of the LED even when the LED lighting device 2 has the PFC function.

While the example in which the PI control is performed as the feedback control has been described in the first embodiment, it is also possible to employ another control method such as a PID control. Further, while the fluctuation of the input voltage is cancelled by changing the ON width of the PWM signal in the above embodiment, the present invention is not limited to this example. For example, in order to perform feedback control with high responsiveness when the input voltage fluctuates, the proportionality coefficient and the integral coefficient may be changed.

The first and second embodiments can be combined as desirable by one of ordinary skill in the art.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. An LED lighting device comprising:
   a lighting circuit that supplies a current to an LED; and
   a controller that generates a control signal for controlling the supply of the current to the LED from the lighting circuit,
   wherein the lighting circuit comprises an input smoothing circuit that converts an input voltage from a commercial power supply connected to the lighting circuit to a direct current (DC) voltage and an inverter circuit that converts the DC voltage to a predetermined DC voltage,
   wherein the controller comprises:
   a first analogue/digital converter (ADC) that is connected to the LED and converts an output current front the LED into a first digital value,
   a feedback control unit that compares the first digital value of the output current from the LED with a target current indicating a predetermined dimming level to feedback-control the control signal so that the LED reaches the predetermined dimming level,
   a second analogue/digital converter (ADC) that is connected to the input smoothing circuit of the lighting, circuit and converts the input voltage from the commercial power supply connected to the lighting circuit into a second digital value, and
   a feedforward control unit that detects a fluctuation of the input voltage from the commercial power supply connected to the lighting circuit based on the second digital value from the second ADC to feedforward-control the control signal according to the fluctuation of the input voltage, the fluctuation of the input voltage being indicated by the second digital value from the second ADC, and
   wherein the inverter circuit receives the control signal from the controller and controls the supply of the current to the LED based on the received control signal.

2. The LED lighting device according to claim 1, wherein:
   the control signal is a PWM signal, and
   the output current to the LED is controlled according to a duty ratio of the PWM signal.

3. An LED lighting device comprising:
   a lighting circuit that supplies a current to an LED; and
   a controller that generates a control signal for controlling the supply of the current to the LED from the lighting circuit,
   wherein the controller comprises:
   a feedback control unit that compares a value of an output current to be output to the LED with a target current indicating a predetermined dimming level to feedback-control the control signal so that the LED reaches the predetermined dimming level, and
   a feedforward control unit that detects a fluctuation of an input voltage from a commercial power supply connected to the lighting circuit to feedforward-control the control signal according to the fluctuation of the input voltage, wherein the control signal is a PWM signal, and the output current to the LED is controlled according to a duty ratio of the PWM signal, and wherein the feedforward control unit multiplies, when the fluctuation of the input voltage occurs, a corrected control signal that is feedback-controlled by the feedback control unit by an inverse number of a rate of fluctuation of the input voltage to change an ON width of the PWM signal.

4. An LED lighting device comprising:

a lighting circuit that supplies a current to an LED; and a controller that generates a control signal for controlling the supply of the current to the LED from the lighting circuit, wherein the controller comprises:

a feedback control unit that compares a value of an output current to be output to the LED with a target current indicating a predetermined dimming level to feedback-control the control signal so that the LED reaches the predetermined dimming level, and a feedforward control unit that detects a fluctuation of an input voltage from a commercial power supply connected to the lighting circuit to feedforward-control the control signal according to the fluctuation of the input voltage, wherein the control signal is a PWM signal, and the output current to the LED is controlled according to a duty ratio of the PWM signal, and wherein when the fluctuation of the input voltage occurs, the feedback control unit generates the PWM signal based on a deviation between the target current and the output current and an integral control element of the deviation, and the feedforward control unit multiplies a corrected control signal generated by the feedback control unit by an inverse number of a rate of fluctuation of the input voltage to change an ON width of the PWM signal and multiplies the integral control element by the inverse number of the rate of fluctuation of the input voltage to update the integral control element.

5. The LED lighting device according to claim 1, wherein the lighting circuit has a power factor correction function of the commercial power supply.

6. An LED illuminating device comprising:

lighting device according to claim 1; and an LED supplied with current from the LED lighting device.

7. The LED lighting device according to claim 1, wherein the inverter circuit includes a transformer having a primary winding and a secondary winding and a switching element connected to the primary winding of the transformer, and the inverter circuit controls the switching element based on the received control signal.

8. The LED lighting device according to claim 1, wherein the input smoothing circuit comprises a first resistor and a second resistor, and the feedforward control unit detects the fluctuation of the input voltage by measuring a voltage from a junction between the first resistor and the second resistor.

* * * * *